United States Patent

[11] 3,559,823

| [72] | Inventor | Albert Ostrin<br>4516 Highway 7, Minneapolis, Minn. 55416 |
|---|---|---|
| [21] | Appl. No. | 807,294 |
| [22] | Filed | Mar. 14, 1969 |
| [45] | Patented | Feb. 2, 1971 |

[54] RAM FEED FOR INCINERATORS
6 Claims, 7 Drawing Figs.

[52] U.S. Cl. ................................................ 214/23,
100/238, 110/109, 198/226, 214/17
[51] Int. Cl. .......................................................... F23k 3/00
[50] Field of Search .......................................... 214/23,
18.28, 83.3, 17.4; 198/226; 110/109; 100/238

[56] References Cited
UNITED STATES PATENTS

| 931,536 | 8/1909 | Weiland | 198/226X |
| 1,740,610 | 12/1929 | Lenk | 214/23 |
| 2,888,155 | 5/1959 | Raymer et al. | 214/17(.4) |
| 3,253,537 | 5/1966 | Porter et al. | 100/238X |

*Primary Examiner*—Robert G. Sheridan
*Attorney*—Williamson, Palmatier & Bains

ABSTRACT: Hydraulic ram apparatus for conveying a mixture of liquid and solid scrap material from a supply hopper through a conduit to an incinerator wherein a shearing head on a feed ram cooperates with a shearing edge on the outlet of the supply hopper to cut up large pieces of solid scrap material as the feed ram reciprocates longitudinally within the supply conduit past the supply hopper outlet. A vertically reciprocal packing piston forces the scrap material out of the supply hopper into the supply conduit in synchronization with the reciprocal movement of the feed ram; and scrap material is tightly compacted by the feed ram within straight, tubular, compacting sections at the inlet and discharge ends of the expanding supply conduit to seal the supply conduit against the rearward movement of combustible gases between the incinerator and supply hopper.

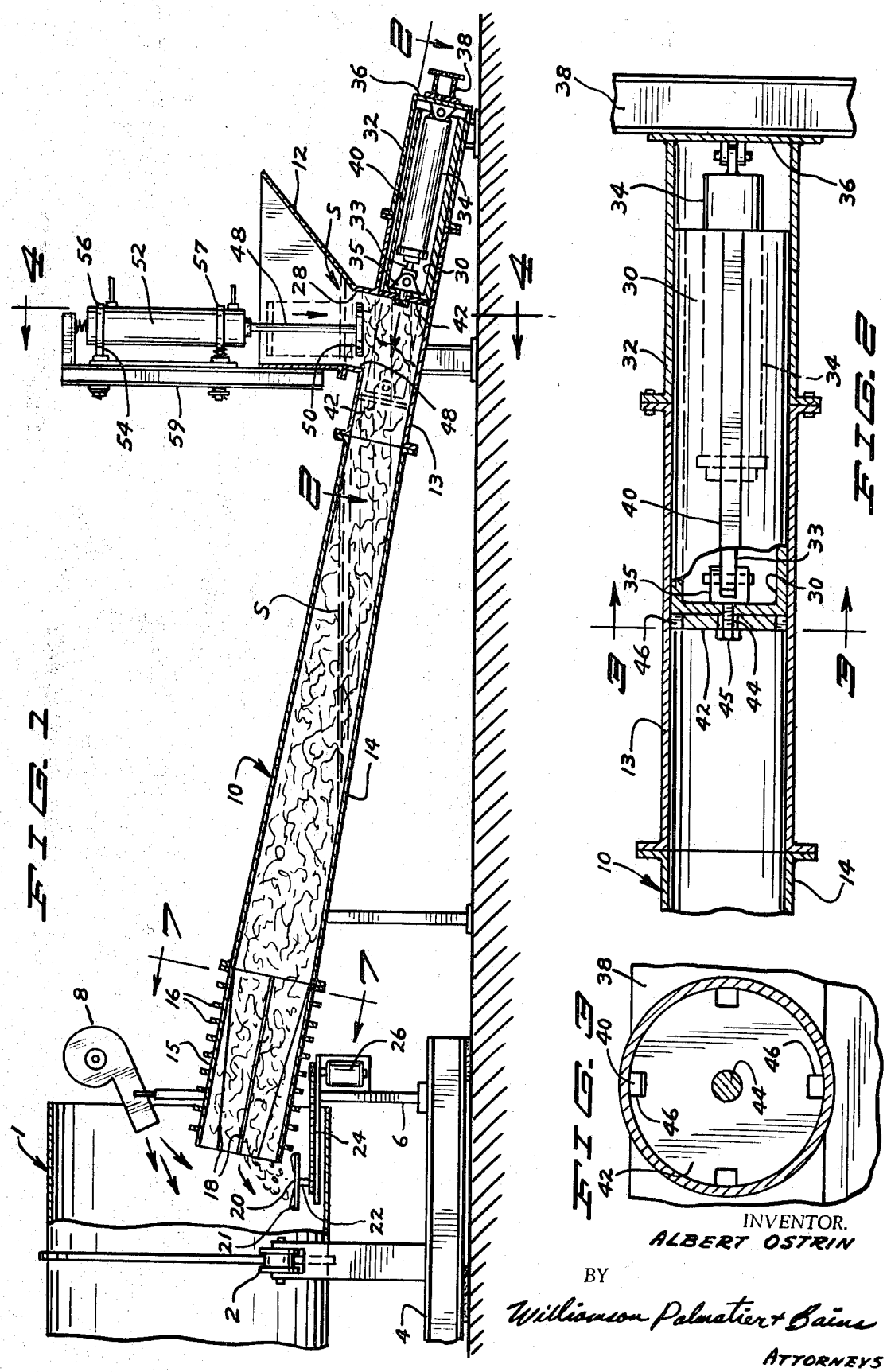

INVENTOR.
ALBERT OSTRIN
BY
Williamson Palmatier + Bains
ATTORNEYS 3,559,823

RAM FEED FOR INCINERATORS

BACKGROUND OF THE INVENTION

Systems for disposing of scrap material and industrial and commercial waste of all types have conventionally utilized an elongated supply conduit for transferring the scrap material from a supply hopper to an incinerator. The conveyor means most commonly employed for moving the scrap material from the supply hopper to the incinerator is a rotary auger which is disposed longitudinally within the supply conduit. For many applications, the rotary auger type of scrap conveyor has proven to be quite satisfactory. This is particularly so when the solid scrap material can be shredded into relatively small pieces and mixed with combustible and noncombustible liquids to form a slurry which is readily conveyable by a rotary auger. However, where such preconditioning of the scrap material is not possible or feasible, considerable difficulty has been experienced with the auger conveyor. Relatively viscous conglomerates of solid and liquid scrap materials are difficult to convey in a steady stream by means of an auger conveyor; and large pieces of solid scrap, such as pipe sections, which may find their way into the supply hopper can interfere with the operation of the auger conveyor and cause it to bind. It is with a view towards eliminating such difficulties associated with the movement of scrap material comprised of a combustible mixture of liquids and viscous materials with solids of all sizes and shapes that the ram feed apparatus of this invention has been developed.

BRIEF SUMMARY OF THE INVENTION

The scrap conveying apparatus of this invention is particularly characterized by a ram feed arrangement which cooperates with a supply conduit of predetermined cross-sectional shape to feed solid, fluid, and semisolid scrap material indiscriminately mixed in a conglomerate mass in a steady stream from a supply hopper to an incinerator drum.

This basic objective is realized by utilizing a shearing head on the feed ram in cooperation with a shearing edge on an outlet opening from the supply hopper to cut up large pieces of solid scrap material to a size which may be readily forced through the supply conduit by the reciprocal movement of the feed ram longitudinally therein. A packing piston serves to load scrap material from the supply hopper into the supply conduit in front of the feed ram and to prevent scrap material from being forced upwardly into the supply hopper through its outlet opening as the feed ram moves forward on its feed stroke.

A particularly beneficial aspect of my invention resides in the removable and rotatable mounting of the shearing head on the forward end of the feed ram so as to permit the shearing head to be periodically rotated to evenly distribute the wear from the shearing action around its periphery.

As a further advantageous feature of my improved ram feed apparatus, I utilize a supply conduit which expands in cross-sectional area from the supply hopper towards the incinerator to provide for the free and unimpeded movement of scrap material therethrough. Straight, cylindrical conduit sections at the inlet and discharge ends of the supply conduit provide sealing zones within which scrap material is tightly compacted by the feed ram to prevent the back flow of flame, heat and combustible gases through the supply conduit to the supply hopper.

These and other objects and advantages of my invention will become readily apparent as the following description is read in conjunction with the accompanying drawings wherein my reference numerals have been used to indicate like elements throughout the several views.

BRIEF DESCRIPTION OF THE DRAWINGS

FIG. 1 is a front elevation view of the scrap feed apparatus of this invention, partially in section;

FIG. 2 is a horizontal section view of the feed ram and supply conduit taken along lines 2–2 of FIG. 1;

FIG. 3 is a vertical section view of the feed ram and supply conduit taken along lines 3–3 of FIG. 2;

In FIG. 1 I have shown my improved scrap conveying apparatus in combination with an incinerator 1 of the rotary drum type. For purposes of illustration, incinerator 1 is shown as consisting of a cylindrical, steel drum rotatably supported by rollers 2 on a base frame 4. Supported at the front end of incinerator drum 1 by upright standard 6 is a pressure burner 8. Burner 8 is of the conventional design adapted to burn liquid or gaseous fuel, and projects inwardly into drum 1 through an opening in the front face thereof. Also extending into the front end of incinerator drum 1 is a supply conduit 10 which serves to convey scrap material from a supply hopper 12 to incinerator 1. Conduit 10 is comprised of a constant cross-sectional area inlet section 13, a central section 14 which gradually expands in cross-sectional area from supply hopper 12 towards incinerator 1, and a discharge section 15 of constant cross-sectional area. A plurality of heat dissipating fins 16 are affixed to the peripheral surface of discharge section 15, and function to dissipate the heat conducted rearwardly along section 15 from incinerator drum 1. Equally spaced around the inside surface of discharge section 15 are a plurality of forwardly tapering knives 18 which function to shread solid chunks of scrap material into relatively small pieces for better burning within incinerator 1. The circumferential disposition of cutting knives 18 within discharge section 15 is shown in FIG. 7. A slinger disc 20 disposed under the outlet end of discharge section 15 receives the scrap material as it leaves supply conduit 10 and distributes it evenly within incinerator drum 1 by means of radially extending vanes 21 thereon. Slinger disc 20 is rotated by vertical drive shaft 22 which is connected to the output shaft of motor 26 by drive chain 24.

Figure 4:
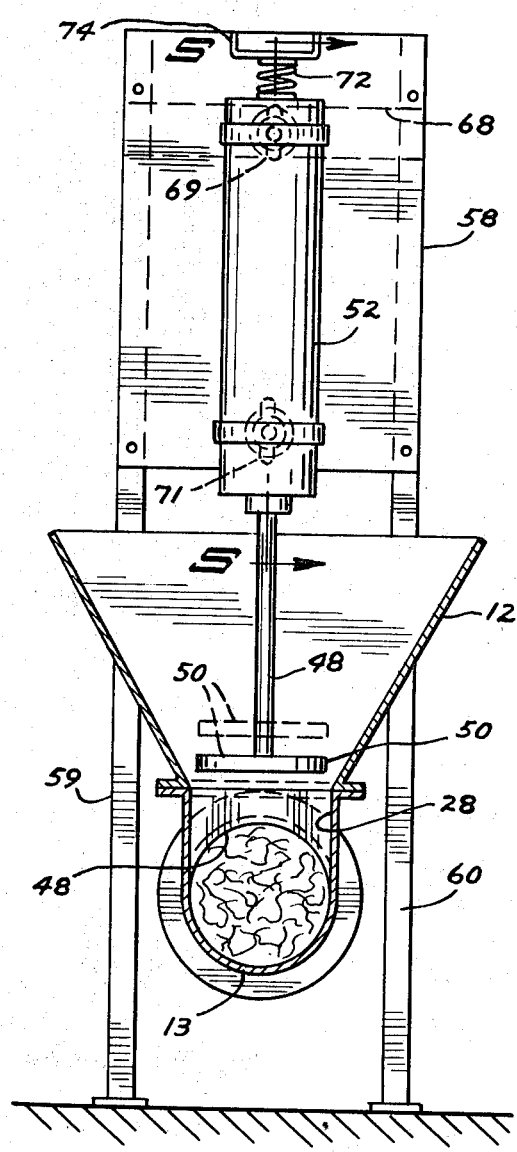
FIG. 4 is a vertical, section view of the packing piston and supply hopper taken along lines 4–4 of FIG. 1.

It is to be noted that supply conduit 10 inclines upwardly from hopper 12 towards incinerator 1. By virtue of this arrangement, a quantity of scrap material in liquid form will be maintained at the lower end of supply conduit 10 within inlet section 13 thereof. Inlet section 13 is in direct communication with outlet opening 28 of supply hopper 12. Liquid scrap within conduit 10 is maintained substantially at level S, and substantially the same level of liquid will be maintained within supply hopper 12. A liquid seal is thus maintained at hopper outlet opening 28 so as to prevent the rearward movement of combustible gases from incinerator 1 through conduit 10 into hopper 12, thereby avoiding combustion flashbacks into and through hopper 12.

Figure 6:
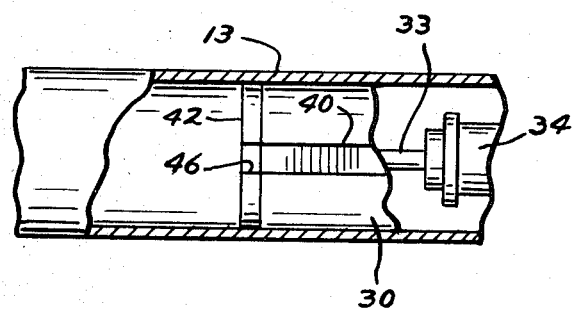
FIG. 6 is a fragmentary, top view of the forward end of the feed ram.

For the purpose of moving scrap material from hopper 12 through conduit 10 into incinerator 1, I utilize a feed ram 30 slidably positioned within rearward extension 32 of supply conduit 10 for longitudinal movement therein. Ram 30 is connected to piston 33 of double-acting hydraulic cylinder 34 by means of bifurcated ear 35. Hydraulic cylinder 34 is anchored at its base end to a base plate 36 affixed to the end of supply conduit extension 32. I-beams 38 serve to reinforce base plate 36 to give a firm mounting for cylinder 34. Reference is now made to FIGS. 1, 2, 3, and 6 for a clear understanding of the structure and mounting arrangement of feed ram 30. Ram 30 is of cylindrical, tubular construction, and when retracted to the position shown in FIG. 1 it encloses hydraulic cylinder 34. Extending lengthwise along the top of ram 30 is an elongated slot 40 which serves as a fluid passage in a manner explained below. A shearing head 42 in the form of a flat, circular disc is removably mounted on the forward end of feed ram 30 by means of threaded stud 44 and nut 45. Stud 44 is affixed to the front end of ram 30. As is indicated in FIG. 3, shearing head 42 is provided with four equally spaced slots 46 in its periphery. Shearing head 42 has a central aperture therein of slightly larger diameter than stud 44, whereby head 42 may be rotatably adjusted thereon in order to bring one of the slots 46 into alignment with elongated groove 40 in feed ram 30. The fragmentary top view of ram 30 illustrated in FIG. 6 shows shear head 42 properly positioned with one of the slots 46 in alignment with groove 40. The lower, forward edge 48 of supply hopper outlet opening 28 (See FIGS. 1 and 4) serves as a shearing edge with which shearing head 42 cooperates to sever relatively large pieces of solid scrap material which will not fit into inlet section 13 of supply conduit 10.

It will be apparent that as feed ram 30 reciprocates forwardly within supply conduit 10 past supply hopper outlet opening 28 it will pick up scrap material force it upwardly into conduit 10. In order to properly load the scrap material into inlet section 13 of supply conduit 10, I have found it desirable to employ some type of packing means to force scrap downwardly out of hopper 12 through outlet opening 28 into inlet section 13. For this purpose, I preferably utilize a packing piston 48 which has a packing head 50 on its lower end. Piston 48 is reciprocated vertically within hopper 12 by means of double-acting hydraulic cylinder 52, piston 48 being movably downwardly on its packing stroke from the raised position shown in phantom lines to a downwardly extended position wherein packing head 50 extends across outlet opening 28. As piston 48 moves downwardly, packing head 50 forces a conglomerate mixture of liquid and solid scrap material from hopper 12 into inlet section 13 of supply conduit 10. The reciprocating movements of packing piston 48 and feed ram 30 are synchronized so that piston 48 will move downwardly on its packing stroke and load a charge of scrap material into inlet section 13 in front of a feed ram 30 when it is retracted rearwardly of outlet opening 28 in the position shown in solid lines in FIG. 1. Packing piston 48 remains in its downwardly extended packing position across outlet opening 28 as feed ram 30 moves forwardly in order to prevent scrap material from being forced back up into hopper 12 through opening 28. It is to be noted that packing head 50 is of lesser diameter than outlet opening 28 of hopper 12, whereby an annular passage will be provided between packing head 50 and outlet opening 28 through which liquid scrap material may flow up into hopper 12 to maintain the desired liquid seal across the opening 28.

Figure 5:
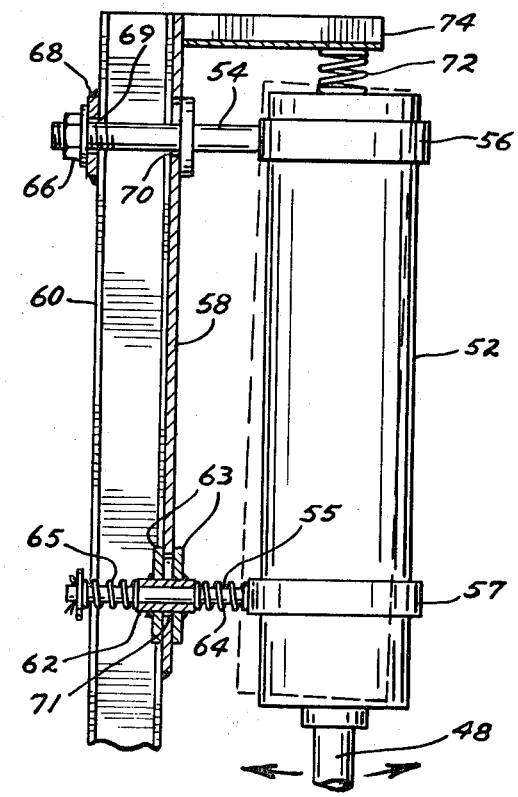
FIG. 5 is an enlarged, fragmentary section view of the packing piston mounting structure taken along lines 5–5 of FIG. 4.
Figure 7:
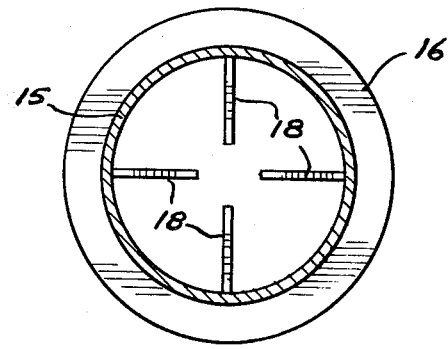
FIG. 7 is a vertical section view through the discharge end of the supply conduit taken along lines 7–7 of FIG. 1.

Because a considerable upward and lateral force will be exerted against packing head 50, piston 48 and hydraulic cylinder 52 as feed ram 30 compacts scrap material within inlet section 13, cylinder 52 is supported in such a way that it can be displaced upwardly and laterally to the phantom line positions shown in FIGS. 4 and 5. This is accomplished by means of a mounting arrangement including a bracket arms 54 and 55 having circular end portions 56 and 57 which firmly embrace hydraulic cylinder 52. Bracket arms 54 and 55 are secured to mounting plate 58 which extends across upright beams 59 and 60. The lower bracket arm 55 is slidably mounted in tubular collar 62 which is welded to washers 63 secured to the inner and outer faces of mounting plate 58. A pair of coil springs 64 and 65 provide counter balancing forces which tend to center bracket arm 55 within slide collar 62. As packing piston 48 and cylinder 52 are deflected laterally to the phantom line position shown in FIG. 5 by the upward movement of feed ram 30, spring 64 will be compressed and serve a shock absorbing function. Upper bracket arm 54 is fastened at its inner end by nut 66 to a brace 68 which extends transversely across support beams 59 and 60. In order to permit the upward displacement of cylinder 52, elongated, vertically extending slots 69 and 70 are provided in brace 68 and mounting plate 58 in the portions thereof through which bracket arm 54 extends. A similar vertical slot 71 is provided at the lower end of mounting plate 58 where bracket arm 55 extends therethrough. Bracket arms 54 and 55 may thus shift upwardly in slots 69, 70 and 71 as cylinder 52 is displaced upwardly to the phantom line position shown in FIG. 4. Coil spring 72 bearing on the top of cylinder 52 and retained by brace 74 extending outwardly from mounting plate 58 serves to cushion cylinder 52 as it is displaced upwardly and to return it to its normal vertical position. Springs 64 and 72 not only accommodate the lateral and upward displacement of cylinder 52 in response to forces exerted on piston head 50 by the compacting pressure of feed ram 30, but they also serve a shock absorbing function to protect cylinder 52 and piston 48 from damage or deformation resulting from the downward impact of packing head 50 against a particularly hard piece of solid scrap material such as a pipe section.

When incinerator 1 is operating, and it is desired to feed scrap material thereinto through supply conduit 10, packing piston 48 is retracted to the raised, phantom line position shown in FIG. 1, and scrap material comprising a mixture of solids of various sizes and shapes, liquids and semisolids in the nature of viscous materials is fed into hopper 12. Packing piston 48 then reciprocates downwardly, and packing head 50 forces a charge of scrap material through hopper outlet opening 28 into inlet section 13 of supply conduit 10. Feed ram 30 then reciprocates forwardly on its feed stroke past hopper opening 28 and packing head 50 to the forward, phantom line position shown in FIG. 1. The conglomerate scrap charge of solids, semisolids and liquids will be compacted tightly within straight inlet section 13 by feed ram 30, thereby providing a sealing plug which prevents the back flow of combustible gases into supply hopper 12. Also, liquid slurry will flow rearwardly through the uppermost slot 46 in shearing head 42 and aligned, elongated groove 40 in the top of feed ram 30 and pass upwardly through outlet opening 28 into supply hopper 12, thereby ensuring the maintenance of a desired liquid level and liquid seal in hopper 12 across outlet opening 28. The liquid seal across hopper outlet opening 28 is intended to be the primary means for preventing the rearward flow of combustible gases into hopper 12. The tightly compacted scrap material within inlet section 13 serves as a supplementary, safety sealing means in the event that the liquid level at the lower end of inclined supply conduit 10 should drop so low that the liquid seal across hopper opening 28 is lost.

The continued reciprocating movement of feed ram 30 as scrap material is fed into inlet section 13 by packing head 50, causes the scrap material to move forwardly within expanding supply conduit central section 14 towards discharge end 15. The expanding cross-sectional area of central conduit section 14 ensures that scrap material will move freely therethrough without compacting and becoming so tightly compressed therein that the movement of additional scrap material therethrough is restricted. As the scrap charge passes through discharge end 15 of supply conduit 10, it is shreaded into relatively small pieces by cutting knives 18 before it drops onto slinger disc 20 for distribution within incinerator 1. Since discharge section 15 is also a straight section of constant cross-sectional area, the scrap material will be somewhat compacted therein. The resulting tight engagement of the scrap material with the inner surface of discharge section 15 further seals supply conduit 10 against the rearward flow of flames and combustible gases as well as preventing a heat loss from incinerator 1 back through conduit 10.

Large pieces of solid scrap material which are too big to be accommodated within supply conduit 10 will be engaged by packing head 50 as it moves downwardly within hopper 12 and prevent piston 48 from completing its downward stroke. As such pieces of solid scrap are held between packing head 50 and the bottom of inlet conduit section 13, they will be sheared off by shearing head 42 as it moves past shearing edge 48 on the forward, feed stroke of ram 30. I have found that even such solid materials as steel bars and pipe sections will be sheared off by shearing head 42 of ram 30, which is to provide a piece of solid scrap small enough to be conveyed through supply conduit 10. Thus, solid scrap material of any size or shape may be dumped into supply hopper 12 without interrupting the continuous flow of scrap material through conduit 10 into incinerator 1. As the top edge of shearing head 42 which accomplishes the cutting action against shearing edge 48 becomes worn, shearing head 42 will be rotated 45° to bring an unused portion thereof into position to engage shearing edge 48. The 45°-rotation of shearing head 42 will bring one of the slots 46 therein into alignment with elongated flow groove 40 in the top of feed ram 30. Shearing head 42 will ultimately be replaced after it has been worn around its entire peripheral edge.

I claim:

1. Apparatus for feeding scrap material comprised of liquids and solids to an incinerator comprising:

a supply hopper having an outlet opening;

a supply conduit inclined upwardly from an inlet end communicating with said outlet opening of said supply hopper towards a discharge end connected to said incinerator, whereby a quantity of liquid scrap material will be maintained at the lower end of said supply conduit to provide a liquid seal across said supply hopper outlet opening, said supply conduit expanding in cross-sectional area in a direction from said supply hopper towards said incinerator and terminating at a discharge section of constant cross-sectional area;

a hydraulic feed ram reciprocally movable longitudinally within said supply conduit back and forth past said supply hopper outlet opening to move scrap material from said supply hopper through said conduit to said incinerator; and a straight, loading and compacting conduit section of constant cross-sectional area at said inlet end of said supply conduit communicating with said supply hopper outlet opening, scrap material being compacted tightly within said straight conduit section in sealing contact therewith by said feed ram to thereby provide an additional safety seal to prevent the backflow of combustible gases from said incinerator into said supply hopper.

2. Apparatus for feeding scrap material to an incinerator as defined in claim 1, and further including:

packing means for loading scrap material from said supply hopper through said hopper outlet opening into said inlet end of said supply conduit, said packing means being movable within said hopper to a position across said hopper outlet opening to pack scrap material into said supply conduit in front of said feed ram when said ram is retracted rearwardly of said supply hopper outlet opening.

3. Apparatus for feeding scrap material to an incinerator as defined in claim 2 wherein:

said packing means comprises a double-acting hydraulically actuated piston vertically reciprocal within said hopper, said piston having a packing head thereon which extends across said hopper outlet opening when said piston is moved downwardly to the bottom of its packing stroke.

4. In combination with an incinerator having an elongated supply conduit extending therefrom to a supply hopper having an outlet opening in the bottom thereof communicating with said supply conduit, improved means for conveying liquid and solid scrap material from said supply hopper through said conduit into said incinerator comprising:

a hydraulically actuated feed ram reciprocal within said supply conduit along the longitudinal axis thereof;

a shearing edge on said outlet opening of said supply hopper; and a shearing head on the forward end of said feed ram slidably cooperable with said shearing edge to cut off solid pieces of scrap material therebetween to a size movable within said supply conduit as said feed ram reciprocates forwardly on a feed stroke past said shearing edge, said shearing head being rotatably and removably mounted on the forward end of said feed ram, whereby said shearing head may be periodically rotated to bring an unworn portion thereof into cooperative relation with said shearing edge, said shearing head being ultimately removed and replaced as its entire periphery becomes worn.

5. Apparatus for feeding scrap material comprised of liquids and solids to an incinerator comprising:

a supply hopper having an outlet opening;

a supply conduit having a discharge end connected to said incinerator and an inlet end communicating with said outlet opening of said supply hopper, said supply conduit being inclined upwardly from said supply hopper towards said incinerator, whereby a quantity of liquid scrap material will be maintained at the lower end of said supply conduit to provide a liquid seal across said supply hopper outlet opening;

a hydraulic feed ram reciprocally movable longitudinally within said supply conduit back and forth past said supply hopper outlet opening to move scrap material from said supply hopper through said conduit to said incinerator; and an elongated slot formed in the top surface of said feed ram and disposed in direct, underlying relation to said supply hopper outlet opening when said feed ram reciprocates forwardly on a feed stroke, said elongated slot serving as a flow passage through which liquid scrap material may flow rearwardly through said hopper outlet opening and into said supply hopper to maintain a predetermined liquid level therein above said outlet opening as said feed ram reciprocates forwardly on its feed stroke.

6. Apparatus for supplying scrap material through an incinerator as defined in claim 4, and further including:

an elongated slot running lengthwise along the top surface of said feed ram; and a plurality of slots equally spaced around the periphery of said rotatable shearing head, one of said slots being rotated into alignment with said elongated ram slot each time said shearing head is rotated to a new position, said elongated ram slot and the one of said shearing head slots in alignment therewith providing a continuous passage through which liquid scrap material may flow rearwardly through said hopper outlet opening and into said supply hopper as said feed ram moves forwardly on its feed stroke.